June 20, 1950 — O. A. MALLORY — 2,512,163
SELF-CLEANING MIXER GATE
Filed Jan. 24, 1946 — 2 Sheets-Sheet 1

INVENTOR.
Ora A. Mallory
BY
Beau, Brooks, Buckley & Beau
Attorneys

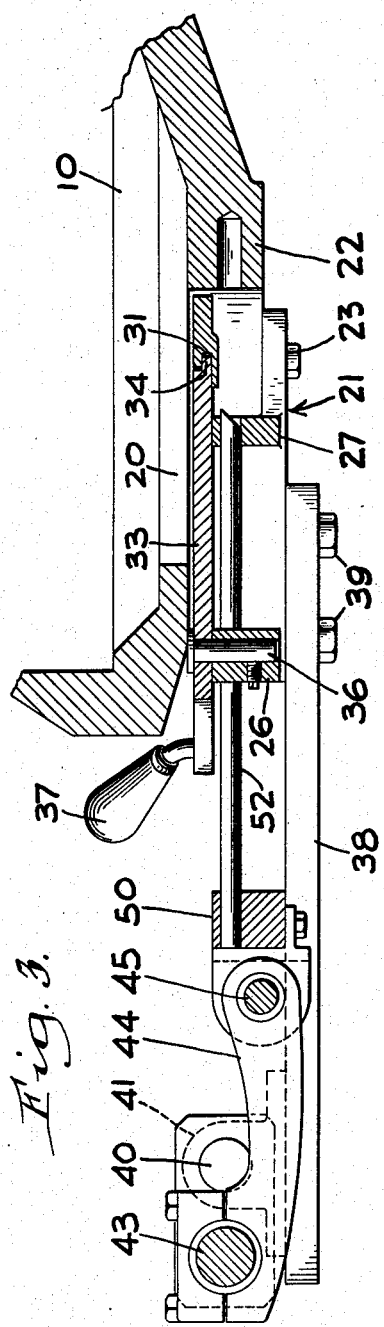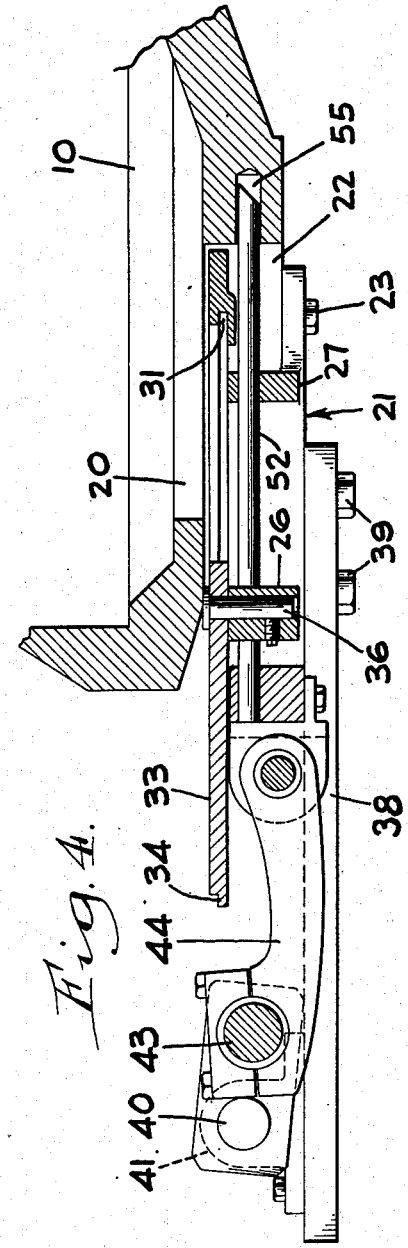

Patented June 20, 1950

2,512,163

UNITED STATES PATENT OFFICE 2,512,163

SELF-CLEANING MIXER GATE

Ora A. Mallory, Akron, N. Y., assignor to National Gypsum Company, Buffalo, N. Y.

Application January 24, 1946, Serial No. 643,171

8 Claims. (Cl. 222—409)

This invention relates to discharge gates for plastic mixers or other containers and particularly to a gate including agitating means for maintaining free and uniform plastic flow of material.

Reference will be had herein by way of example to the art of fabricating cementitious wall board or plaster lath, wherein a mixer is provided for substantially continuously depositing a plastic cementitious mixture, as for instance wet gypsum, upon a continuously moving belt or table. This apparatus is generally known in the art as a board machine and there is a marked tendency for gypsum to set up and harden about the discharge opening of the mixer and thus clog and gradually reduce the size of the discharge opening.

The present invention provides means for effectively preventing clogging and reduction in the size of the discharge opening by maintaining a continuous condition of agitation substantially in the plane of the discharge opening, and likewise provides manual means for readily controlling and adjusting the rate of discharge. This insures an adequate supply of mix for the continuous formation of wall boards and at the same time prevents any excess collection or build up of the plastic material at the sizing or caliper rolls.

A single complete embodiment of the device of the present invention is illustrated in the accompanying drawings and described in detail in the following specification. However, it is to be understood that various mechanical modifications may be made without departing from the spirit of the invention which is limited in principle only as defined in the appended claims.

In the drawings:

Fig. 3 is a longitudinal cross sectional view of the line III—III of Fig. 2; and Fig. 4 is a view similar to Fig. 3 but with the discharge gate open and the agitating elements in an opposite position from that of Fig. 3.

Figure 1:
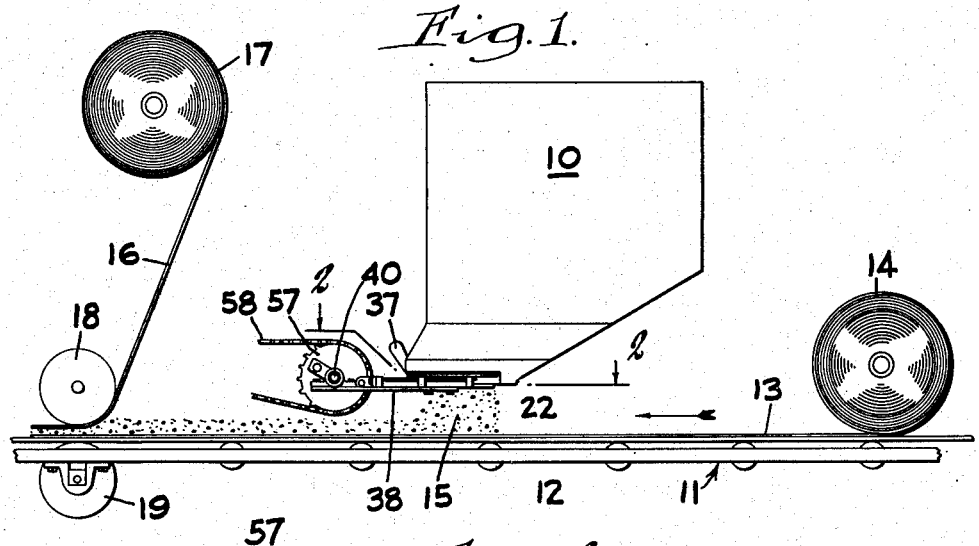
Fig. 1 is a general fragmentary elevational view of a board machine having the apparatus of the present invention associated therewith.

Throughout the several figures of the drawings like characters of reference denote like parts and, referring to Fig. 1 particularly, the numeral 10 designates a conventional ball mixer which is supported above a moving board machine table designated generally 11 and including a board receiving belt 12. A sheet of facing paper 13 is placed upon belt 12 from a roll 14 and the gypsum mix is deposited thereon as shown at 15. A top facing sheet of paper 16 is then placed over the deposited mix from a roll 17, a pair of caliper rolls 18 and 19 being provided to insure proper thickness of the finished board.

The present invention is concerned only with the means for discharging plastic cementitious mix from mixer 10 on to the moving paper sheet 13. Referring to Figs. 3 and 4, the mixer 10 terminates at its lower end in a discharge opening 20. In a general way, the entire apparatus of the present invention is supported by a main frame 21 which is bolted to a bottom flange 22 of the mixer 10 as at 23. The main frame 21 has a pair of arcuate side frame securing elements 25 connected rigidly by a transverse central bar portion 26 and another transverse bar portion 27.

The main frame 21 is further provided with a semi-circular portion 30 formed rigidly therewith and having a concentric groove formation 31 at its inner side. The exterior of portion 30 fits within the margin of opening 20 formed by flange 22.

Figure 2:
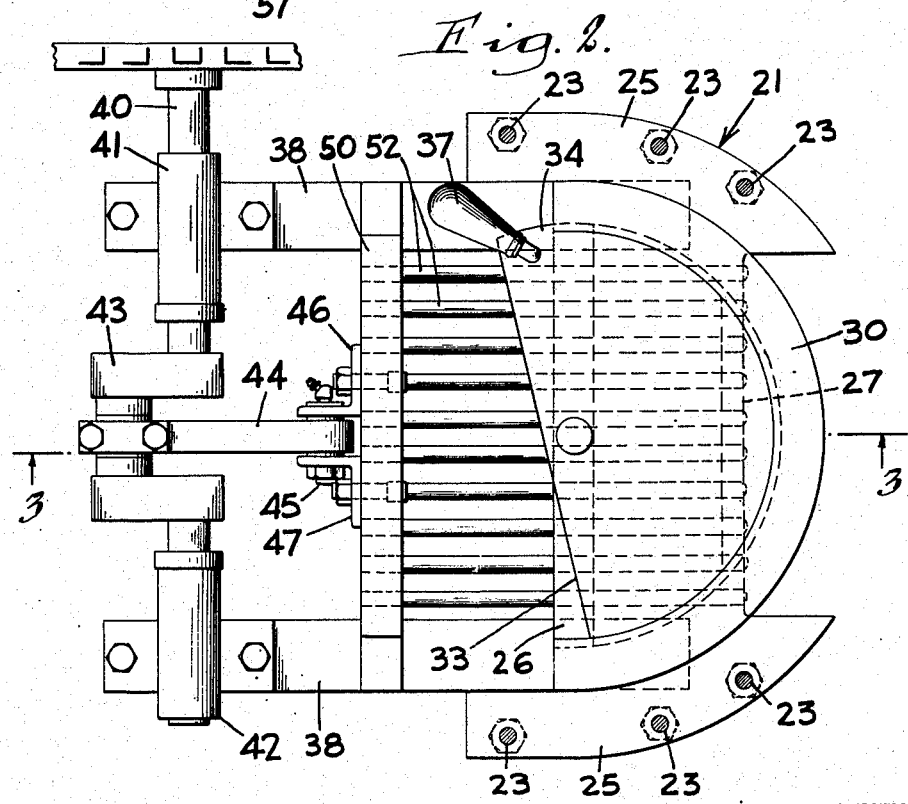
Fig. 2 is a top plan view of the novel apparatus provided by the present invention.

A gate 33 comprises a semi-circular plate whose peripheral edge is flanged as at 34 to interfit with the grooved formation 31 and gate 33 is pivoted concentrically with respect to the semi-circular portion 30 of the frame 21 by means of a pivot pin 36 which is secured in the central transverse bar portion 26 of frame 21. In Figs. 2 and 3 gate 33 is shown in fully closed position and a manual handle 37 is secured to one edge thereof for movement to either a partially opened position or the fully opened position illustrated in Fig. 4.

A pair of rigid parallel bars 38 are secured to the under side of frame 21 as at 39 and extend away from the frame proper to support a crank shaft 40 through the medium of bearing blocks 41 and 42. Crank shaft 40 has a crank throw 43 pivotally engaging one end of a connecting rod or pitman 44 which extends to pivotal engagement with a pin 45 supported by a pair of brackets 46 and 47 which are fixed to a bar 50 which rests upon bars 38 and extends parallel to crank shaft 40 and the central bar portion 26 of frame 21. Bar 50 is slidable along the bars 38 and is reciprocated by rotation of crank shaft 40. A plurality of parallel agitating bars or prongs 52 are each fixed at one end to bar 50 and extend freely through openings in bar portions 26 and 27 of frame 21.

Continuous rotation of crank shaft 40 moves bar 50 back and forth along bars 38 and moves agitating bars 52 continuously between the opposite limit positions illustrated in Figs. 3 and 4.

In the limit position shown in Fig. 4 the free ends of bars 52 project into openings 55 formed in the flange 22 provided at the lower portion of mixer 10. Relatively slow rotation of crank shaft 40 is found to maintain a free and clear condition of the opening 20 and the opening formed by gate 37 when it is in partially or wholly opened position. The drive for crank shaft 40 may be in any desired manner and in the illustrated instance a sprocket 57 fixed to an end thereof has a driving chain 58 which may extend to any desired rotating part of the board machine.

What is claimed is:

1. Apparatus for association with the discharge opening of a plastic mix container, said apparatus including framework securable adjacent said opening, a gate element pivoted to said framework adjacent said opening and movable pivotally to open and closed position with respect to said opening, agitating means comprising a plurality of spaced parallel bars movable lengthwise across said opening, and means for continuously reciprocating said bars to insure a continuous uniform flow of plastic mix when said gate is open.

2. Apparatus for association with the discharge opening of a plastic mix container, said apparatus including framework securable adjacent said opening, a gate element pivoted to said framework adjacent said opening and movable pivotally to open and closed position with respect to said opening, said framework including a rigid bar extending across said opening, agitating means comprising a plurality of spaced parallel bars extending slidably through said rigid bar and movable lengthwise across said opening, and means for continuously reciprocating said parallel bars slidably in said rigid bar to insure a continuous uniform flow of plastic mix when said gate is open.

3. Apparatus for association with a plastic mix container having a downwardly directed discharge opening, said apparatus including framework securable against the under side of said container in registry with said opening, a gate element pivoted to said framework and guided thereby for horizontal pivotal movement into and out of registry with said discharge opening, agitating means guided for continuous reciprocation in a horizontal plane directly beneath said gate element, said agitating means comprising a series of spaced parallel horizontally extending bars reciprocable simultaneously in the direction of their lengths, and means for continuously reciprocating said bars.

4. Apparatus for association with a plastic mix container having a downwardly directed discharge opening, said apparatus including framework securable to the under portion of said container in registry with said opening and having a portion horizontally offset with respect to said opening, a gate element pivoted to said offset portion for rotary movement into and out of registry with said opening, agitating means mounted for sliding movement on said offset portion and having a plurality of spaced parallel prongs extending horizontally therefrom toward said opening, said prongs being directly beneath said gate element, and power driven crank means on said offset portion for continuously reciprocating said prongs across the discharge area.

5. Apparatus for association with a plastic mix container having a downwardly directed discharge opening, said apparatus including framework securable to the under portion of said container in registry with said opening and having a portion horizontally offset with respect to said opening, a gate element pivoted to said offset portion for rotary movement into and out of registry with said opening, said framework including a rigid bar extending across said opening, agitating means mounted for sliding movement on said offset portion and having a plurality of spaced parallel prongs extending horizontally therefrom toward said opening and through said rigid bar, said rigid bar and said prongs being directly beneath said gate element, and power driven crank means on said offset portion for continuously reciprocating said prongs across the discharge area.

6. Apparatus for association with a plastic mix container having a downwardly directed discharge opening, said apparatus including framework securable to the under portion of said container in registry with said opening and having a portion horizontally offset with respect to said opening, a gate element pivoted to said offset portion for rotary movement into and out of registry with said opening, agitating means mounted for sliding movement on said offset portion and having a plurality of spaced parallel prongs extending horizontally therefrom toward said opening, said prongs being directly beneath said gate element, and means for continuously reciprocating said prongs across the discharge area.

7. Apparatus for association with a plastic mix container having a downwardly directed discharge opening, said apparatus including framework securable to the under portion of said container in registry with said opening and having a portion horizontally offset with respect to said opening, a gate element pivoted to said offset portion for rotary movement into and out of registry with said opening, said framework including a rigid bar extending across said opening, agitating means mounted for sliding movement on said offset portion and having a plurality of spaced parallel prongs extending horizontally therefrom toward said opening and through said rigid bar, said rigid bar and said prongs being directly beneath said gate element, and means for continuously reciprocating said prongs across the discharge area.

8. Apparatus for association with a plastic mix container having a downwardly directed discharge opening, said apparatus including framework securable to the under portion of said container in registry with said opening and having a portion horizontally offset with respect to said opening, an arcuate gate element pivoted to said framework for rotary movement into and out of registry with said opening, agitating means mounted for sliding movement on said offset portion and having a plurality of spaced parallel prongs extending horizontally therefrom toward said opening, said prongs being directly beneath said gate element, and power driven crank means on said offset portion for continuously reciprocating said prongs across the discharge area.

ORA A. MALLORY.

REFERENCES CITED

The following references are of record in the file of this patent:

UNITED STATES PATENTS

| Number | Name | Date |
|---|---|---|
| 161,145 | Moder | Mar. 23, 1875 |
| 173,380 | Wight et al. | Feb. 8, 1876 |
| 378,371 | Loftus | Feb. 21, 1888 |
| 465,312 | Arnett | Dec. 15, 1891 |
| 1,219,823 | Kerr | Mar. 20, 1917 |